United States Patent

Donovan

[11] 3,948,776
[45] Apr. 6, 1976

[54] APPARATUS AND SYSTEM FOR GENERATING A PROTECTIVE COATING IN A ROTARY CONCENTRATOR FOR ABRASIVE SOLIDS-CONTAINING FLUIDS

[75] Inventor: James Donovan, Cambridge, Mass.

[73] Assignee: Artisan Industries Inc., Waltham, Mass.

[22] Filed: Nov. 18, 1974

[21] Appl. No.: 524,820

[52] U.S. Cl. ............... 210/320; 210/332; 210/336
[51] Int. Cl.² ........................................ B01D 29/00
[58] Field of Search ........... 210/320, 323, 336, 339, 210/413–415, 457

[56] References Cited
UNITED STATES PATENTS

| | | | |
|---|---|---|---|
| 3,437,208 | 4/1969 | Kaspar et al. | 210/331 X |
| 3,455,821 | 7/1969 | Aremaa | 210/414 |
| 3,477,575 | 11/1969 | Nemec et al. | 210/332 X |

Primary Examiner—Charles N. Hart
Assistant Examiner—Richard W. Burks
Attorney, Agent, or Firm—Richard L. Cannaday; William J. Ungvarsky; Robert T. Tobin

[57] ABSTRACT

In a rotary concentrator for continuous separation of a vehicle fluid and a concentrate of solids from an abrasive solids-containing fluid, a plurality of solids-detaining baffles and pockets are provided within the concentrator to collect deposits of the abrasive materials. This depositing of materials upon interior surfaces of the concentrator provides an autogenous, relatively stationary protective layer of abrasive material which protects those surfaces from the abrasive action of solids-containing material flowing past them during operation of the concentrator.

11 Claims, 3 Drawing Figures

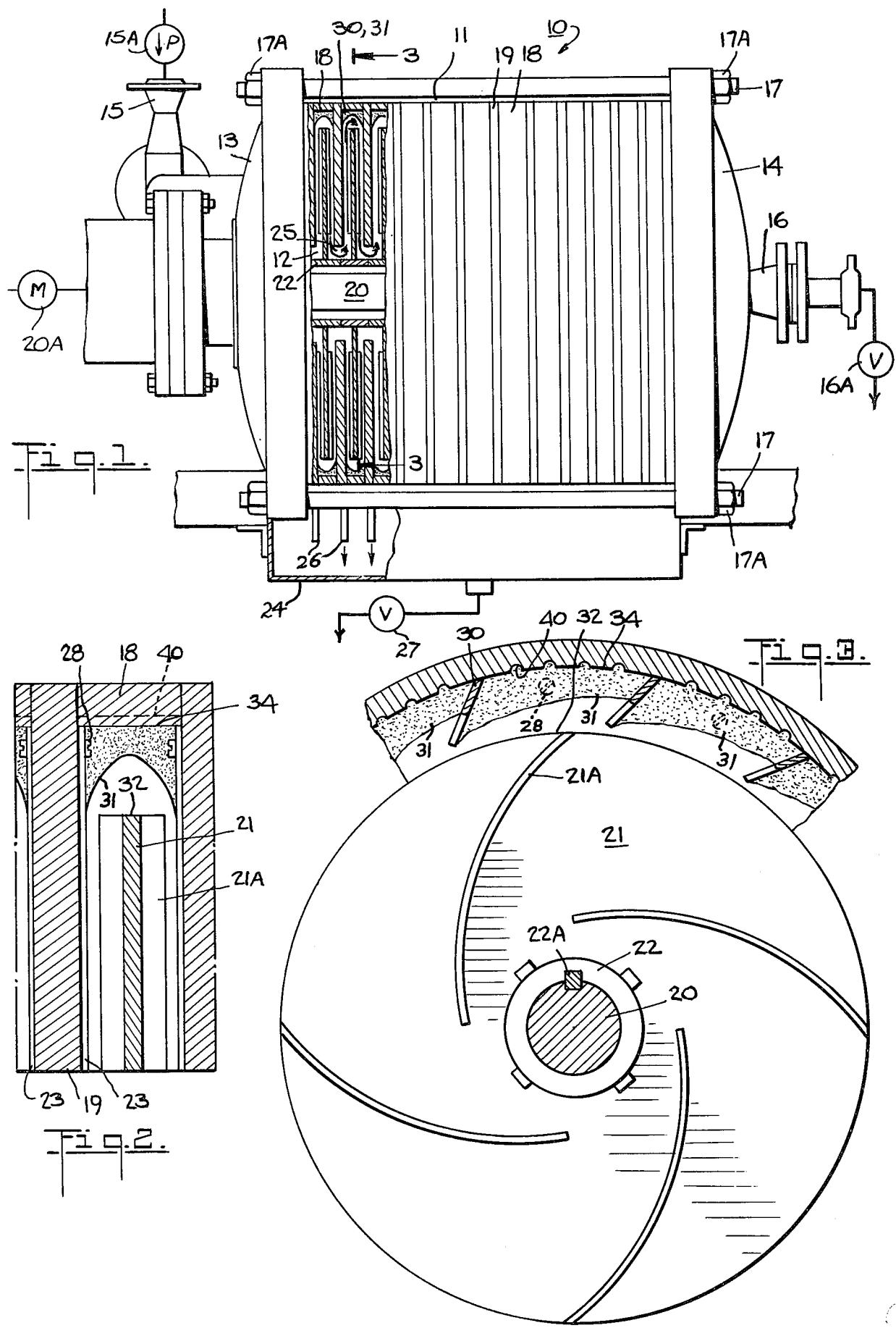

APPARATUS AND SYSTEM FOR GENERATING A PROTECTIVE COATING IN A ROTARY CONCENTRATOR FOR ABRASIVE SOLIDS-CONTAINING FLUIDS

BACKGROUND OF THE INVENTION

This invention relates to a rotary-type concentrator for continuous processing of abrasive solids-containing fluids in which interior surfaces of the concentrator are autogenously protected from the abrasive action of fluids flowing past such surfaces. More particularly, this invention relates to a rotary-type concentrator in which structural elements are provided to collect and detain upon interior surfaces of the concentrator a relatively stationary deposit of the abrasive material being processed to thereby protect those surfaces from the abrasive action of the material flowing therepast.

Some solids-containing fluids contain highly abrasive materials which can substantially shorten the operating life of rotary-type concentrators which employ a plurality of rotating members to separate a vehicle fluid and a concentrate of solids from a solids-containing fluid. For example, fluidized coal passed under pressure through such a concentrator to separate the coal from its vehicle fluid can be highly destructive of the interior surfaces of the concentrator due to the abrasive action of the coal within the concentrator. This problem has limited the usefulness of rotary concentrators in the separation of abrasive materials.

OBJECTS OF THE INVENTION

Accordingly, it is an object of this invention to provide a rotary-type concentrator which can operate on a continuous basis for separating a vehicle fluid and a concentrate of solids from an abrasive solids-containing fluid.

It is a further object of this invention to provide a concentrator having structural elements which protect interior relatively stationary parts of the concentrator against the abrasive action of solids processed through the concentrator.

It is a further object of this invention to protect interior members of a rotary-type concentrator by providing elements within the concentrator which detain and accumulate abrasive material being processed to provide an autogenous protective layer of the abrasive material upon interior surfaces of the concentrator.

It is a further object of this invention to provide a rotary-type concentrator capable of continuous processing of abrasive solids-containing fluid without a need for excessive maintenance or attention.

SUMMARY OF THE INVENTION

Briefly, the invention provides a concentrator for separating a vehicle fluid and a concentrate of abrasive solids from an abrasive solids-containing fluid in which a layer of abrasive material is initially built up and then positively maintained by structural elements of the concentrator during the continued operation thereof. The layer of abrasive material protects the surfaces of the concentrator upon which it is maintained against the abrasive action of solids-containing fluid flowing past those surfaces.

In one form of the invention, baffles or pockets are provided on interior surfaces of the concentrator to detain and accumulate a layer of material from the solids-containing fluid during initial passage of the fluid through the concentrator. This accumulation provides an autogenous protective layer for the concentrator during further processing of the abrasive materials. This planned-for deposit of material upon the interior surface of the concentrator serves to protect the structural components of the concentrator from erosive deterioration likely to be caused by abrasive material impinging upon them during long-continued operation of the concentrator. Thus, after the accumulation of layers of abrasive material on the surfaces of the concentrator the subsequent impingement of the abrasive material against those surfaces will act only to abrade the surfaces of the deposited abrasive material itself and will not subject the structural surfaces of the concentrator to wear. In the course of being abraded, however, the deposited surfaces will be replenished and accreted and will achieve eventual and desirable steady-state levels.

To accomplish the objects of the invention solids-detaining pockets such as suitably located grooves, scallops or flutes may be provided within the concentrator to collect material on interior surfaces of the concentrator, and solids-detaining baffles may be provided which extend in from the housing of the unit for the same purpose.

Augmentatively or conjunctively with the use of baffles or pockets to detain solid material and positively maintain a protective layer thereof, the spacing between the radial peripheries of rotating discs and their bounding housing surfaces within the concentrator may be increased over the spacing employed for a concentrator intended for use in processing non-abrasive materials to encourage the build-up of deposits upon such surfaces. The increase in the spacing provides a wider flow path for the concentrate as it makes its turns around the outer edges of the rotating members and thereby reduces the fluid velocity along the flow path. This facilitates adhesion of centrifuged particles of abrasive material in and to the corners and on stationary interior walls of the concentrator which are on the sides of the flow path opposite those of the outside edges of the rotating members. The adhesion and subsequent accumulation of materials acts to protect those corner and wall surfaces as well as bolt heads and other hold-down devices located on them. Hardened material or wear-resistant materials such as rubber may be used on the surfaces of the concentrator members which rotate through the abrasive material being processed within the unit.

BRIEF DESCRIPTION OF THE DRAWINGS

The nature and substance of the present invention as well as its objects and advantages will be more clearly perceived and fully understood from consideration of the following detailed description and appended claims taken in conjunction with the accompanying drawings in which:

FIG. 1 is a side elevation view in partial cross-section of a rotary concentrator according to this invention having a plurality of coaxially mounted radially extensive rotor disc elements alternately disposed with coaxially mounted filter elements, and solids-detaining baffles extending inwardly toward the separation chamber of the concentrator;

FIG. 2 is an enlarged view of a portion of the concentrator of FIG. 1 showing an accumulation of detained solids in a region between adjacent filter elements and the outside edge of a rotor disc element, and FIG. 3 is a cross-sectional view along the line 3—3 of FIG. 1 looking in the direction of the arrows and showing the baffles extending inwardly toward the separation chamber of the concentrator, and pockets in the form of grooves extending outwardly from the separation chamber and into the concentrator's housing.

DESCRIPTION OF THE PREFERRED EMBODIMENTS

Referring now to the drawings in detail, FIG. 1 illustrates a concentrator 10 having a housing 11 which defines a separation chamber 12 and includes a pair of end plates 13, 14 at its opposite ends. The front end plate 13 is provided with an inlet spigot 15 which is coupled to a pump or fluid supply means 15A for the introduction into the concentrator of a relatively thin solids-containing fluid, while the rear end plate 14 is provided with an outlet spigot 16 for the removal from the concentrator of a concentrate of solids which will be in the form of a thickened slurry. In addition, the outlet spigot 16 has a control valve 16A to regulate discharge of the thickened or concentrated slurry through the spigot. Housing 11 is of built-up or stacked construction and is held together by a plurality of tie rods 17 each with a nut 17A on each end. Those rods and nuts press together end plates 13, 14 between which are a plurality of ring-like elements 18 which are each secured as by welding to a separate annular filter element 19 prior to final assembly of the concentrator with the tie rods 17. Those ring-like elements 18 constitute outer rims or flanges for their respective filter elements 19.

A rotor shaft 20 operatively coupled to a motor 20A extends through the front end plate 13 of the housing of the concentrator 10 and terminates within the separation chamber 12. That shaft 20 passes through central openings 25 in the filter elements 19 and carries a plurality of radially extensive discs 21 which turn with the separation chamber 12 with the rotor shaft. The rotor discs 21 are each of solid configuration with vanes 21A on opposite surfaces. See especially FIGS. 2 and 3. Each disc is secured as by welding to a collar or hub 22, and the hubs 22 are in turn secured angularly by a key 22A to the rotor shaft. Each rotating element 21 has an outer, generally cylindrical periphery of a diameter less than the inside diameter of the flange portions 18 of the annular filter elements 19, and the edges of the vanes 21A on the side surfaces of the rotor discs 21 are spaced from any end wall 13, 14 or filter element 19 which is adjacent the respective rotor disc. The hubs 22 of the rotor discs 21 are in abutting relationship, and serve to space the discs 21 in alternating relationship with the filter elements 19 along the longitudinal axis of the rotor shaft 20. A nut (not shown) on the cantilevered end of the shaft near the concentrate discharge spigot 16 keeps the discs packed tightly in axial array along the shaft.

Each filter element 19 is of annular configuration with a central opening 25 for the passage of the rotor shaft 20. In addition, each filter element 19 is provided with a pair of opposing filtering surfaces 23 formed for example by filter cloth. Also, each filter element is of hollow construction or internally channelled and bored to provide for passage of filtrate through the filtering surfaces 23 and thence to a filtrate drain pan 24 from drains 26 for the respective filter elements 19. A valve 27 is provided to control the discharge of filtrate from the drain pan. The filtering materials of surfaces 23 of the filter elements are secured in place in a known manner, as by means including circumferentially spaced bolts 28 which thread into each filter element on opposite sides thereof at a radius just short of the inner radius of the respective filter element's concentric ring 18, and at opposite points near the central opening 25.

In the embodiment of this invention shown in FIG. 1, each separation sub-chamber defined between adjacent filter elements has a plurality of baffles 30 mounted around the interior circumference of the housing 11. As shown in FIG. 3, the baffles 30 may be disposed a substantially uniform distance from each other and inclined at an angle to the periphery of the housing or radii thereof. The preferred direction of baffle angulation, if any be used, may depend upon such factors as the direction of rotation of discs 21 and the agglomerative characteristics of the solid material in the fluid being processed. Also as shown in FIG. 3 grooved or fluted or scalloped regions 40 are provided in the surface of the interior wall of the housing 11. Those regions are formed in spacer rings or flanges 18 and may occur at a greater frequency than baffles 30. With the baffles 30 and pocket-like regions or grooves 40 arranged in the manner illustrated in FIG. 3, solid material from the fluid being processed is trapped, detained and accumulated in deposits 31 along the inside surface of the housing when the concentrator is operated.

Hardened wear-resistant material or rubber may be employed for the surfaces of members such as the rotor discs 21 which revolve through the steadily thickening solids-containing fluid and may accordingly not adequately maintain layers of abrasive solids in pockets defined in or on the surfaces of those members. Further, the spacing between the peripheries 32 of the rotor discs 21 and the adjacent interior surfaces 34 of the spacer rings 18 is sufficiently great that a centrifugal build-up of a layer of abrasive material on each surface 34 is encouraged by the widening of the flow path for fluid about peripheral edges 32 and a decrease of fluid velocity adjacent the surfaces 34. Grooves 40 in those surfaces are shown straight and disposed substantially parallel to rotor shaft 20, but they may be of other configurations and orientations. For example, they may be of herringbone formation.

During operation, as the rotor discs 21 are rotated there is a flow of solids-containing fluid from inlet spigot 15 in a sinuous pattern from one side of each rotor disc 21 to its other side, at the same time across the filtering surfaces 23 of the filter elements 19 as indicated in FIG. 1, with the fluid making a tight U-turn about the outer periphery 32 of each disc 21 and the inner periphery of each filter element 19. During such operation the grooved regions or pockets 40 and the baffles 30 trap and retain a layer of abrasive solids along the composite interior wall 34 of concentrator housing 11 as aforedescribed. That build-up of material, once a stable condition of it is achieved, protects the underlying or bounding structural surface from on-going erosive or abrading effects of the solids in the fluid during long-continued processing of fluid within the concentrator.

CONCLUSION

As appears from the foregoing, by the present invention a concentrator for separating abrasive solids from a vehicle fluid or liquid is provided in which interior surfaces of the concentrator are protected from the deleterious abrading effect of the material being processed. In one capability or operational attribute, baffles are mounted along the interior periphery of the concentrator housing to detain and accumulate abrasive solids which form an autogenous protective coating themselves over the surface of the concentrator at which the baffles are provided and also over certain immediately adjacent surfaces, i.e., the outer lateral surfaces of filter elements 19 cornered on interior surfaces 34 of spacer rings 18. In another capability, pockets or pocket-like regions are provided which extend into certain surfaces of the concentrator to protect those surfaces or at least portions thereof by accumulating solids and holding them stationary with respect to the surface or surfaces in question.

While in the embodiments of this invention particularly described herein, which are complementary and not exclusionary, the filter elements 19 and the housing 11 for the concentrator are represented as being stationary, it is within the contemplation of this invention that all filter elements, the housing or both all filter elements and the housing can rotate or be otherwise nonstationary, so long as there be relative angular motion between a rotor element and the concentrator's housing and filter surfaces 23 of the filter elements. More generally, it is contemplated that there be at least two spaced-apart surfaces which are stationary relative to each other, and a rotor element which extends between and is in movement with respect to the relatively stationary surfaces. In that regard it is further contemplated that the housing of the concentrator and the relatively stationary surfaces may rotate in either the same direction as or the opposite direction from the rotor element.

Also, while the herein particularly described embodiments of this invention include relatively stationary filter elements 19 which cooperate with rotor discs 21 of solid construction it is contemplated that relatively stationary discs of solid construction can be employed in association with filter members carried by a rotor shaft. Further, it is contemplated that a concentrator according to this invention can comprise an alternating or serial arrangement of radially extensive elements which are sometimes of hollow construction to serve as filter elements and sometimes of solid construction, together with an alternating or serial arrangement of relatively stationary annular disc members which are sometimes of hollow construction to serve as filter elements and sometimes of solid construction.

In general, whether relatively stationary or relatively moving or movable, there should be a filter disc surface adjacent each solid or impermeable disc surface from element to element although one filter disc surface could operate adjacent another such surface. To have two solid disc surfaces in immediate series, one turning and one relatively stationary, would serve no purpose except guidance and conveyance of the fluid being processed.

Protection by Letters Patent of this invention in all its aspects as the same are set forth in the appended claims is sought to the broadest extent that the prior art allows.

I claim as my invention:

1. In an apparatus for continuous separation of an abrasive solids-containing fluid into a vehicle fluid and a concentrated slurry of solids which includes (1) a housing characterized by an interior surface and a longitudinal axis and having an inlet for introducing a solids-containing fluid into said housing and and outlet for removing a concentrated slurry of solids therefrom; (2) at least two substantially parallel, coaxially disposed, spaced-apart annular elements mounted within said housing on the longitudinal axis thereof and established stationarily with respect thereto between said inlet and said outlet; (3) a rotor shaft extending within said housing along the longitudinal axis thereof and passing coaxially through said annular elements in spaced diametral relation thereto leaving openings for fluid flow between the outer surface of said shaft and the inner circumferential surfaces of said annular elements, said shaft being rotatable with respect to said housing and said annular elements, and (4) a radially extensive rotor element having one side and another, opposite side and an outside edge mounted to said rotor shaft to turn therewith with its outside edge terminating in spaced relation to the interior surface of said housing and positioned between said spaced-apart annular elements to define a flow path for solids-containing fluid from said inlet to said outlet extending across at least one side of one of said spaced-apart annular elements between it and one side of said rotor element, then between the outside edge of said rotor element and the interior surface of said housing and then between the other, opposite side of said rotor element and the other of said annular elements with at least one of those elements being a filter means comprising a filter chamber having at least one filtering surface serving as a boundary of said flow path with the interior of that chamber being in fluid flow commmunication with the exterior of said housing for the removal of filtrate vehicle fluid from that chamber, the improvement comprising means within said housing for detaining abrasive solids from the abrasive solids-containing fluid and thereby autogenously providing an essentially static deposit of abrasive solids between said housing and said flow path for protecting the interior surface of said housing from abrasion by further solids moving in said flow path.

2. The improvement of claim 1 wherein said detaining means comprises at least one baffle mounted to the interior surface of said housing.

3. The improvement of claim 2 wherein said baffle extends inwardly from the interior surface of said housing in the region between said spaced-apart annular elements and the outside edge of said rotor element.

4. The improvement of claim 2 wherein said baffle is in the form of a plate-like member extending inwardly from and nonradially with respect to the interior surface of said housing.

5. The improvement of claim 1 wherein said detaining means comprises a plurality of pockets in he interior surface of said housing in the region between said spaced-apart annular elements and the outside edge of said rotor element.

6. The improvement of claim 5 wherein said pockets are grooves disposed substantially parallel to said rotor shaft.

7. The improvement of claim 1 wherein said detaining means comprises at least one baffle mounted to the interior surface of said housing and a plurality of pockets in that surface, both said baffle and said pockets being in the region between said spaced-apart annular elements and the outside edge of said rotor element.

8. In an apparatus for continuous separation of an abrasive solids-containing fluid into a vehicle fluid and a concentrated slurry of solids which includes (1) a housing characterized by an interior surface and a longitudinal axis and having an inlet for introducing a solids-containing fluid into said housing and an outlet for removing a concentrated slurry of solids therefrom; (2) at least two substantially parallel, coaxially disposed, spaced-apart annular filter elements mounted within said housing on the longitudinal axis thereof and established stationarily with respect thereto between said inlet and said outlet, said filter elements each comprising a filter chamber having at least one filtering surface with the interior of each filter chamber being in fluid flow communication with the exterior of said housing for the removal of filtrate vehicle fluid from those chambers and filtering surfaces on said two filter elements being in facing relation one to the other from filter element to filter element; (3) a rotor shaft extending within said housing along the longitudinal axis thereof and passing coaxially through said annular filter elements in spaced diametral relation thereto leaving openings for fluid flow between the outer surface of said shaft and the inner circumferential surface of said annular filter elements, said shaft being rotatable with respect to said housing and said filter elements, and (4) a radially extensive rotor element having one side and another, opposite side and an outside edge mounted to said rotor shaft to turn therewith with its outside edge terminating in spaced relation to the interior surface of said housing and positioned between said spaced-apart annular filter elements to define a flow path for solids-containing fluid from said inlet to said outlet extending between a filtering surface of one of said filter elements and one side of said rotor element, then between the outside edge of said rotor element and the interior surface of said housing and then between the other, opposite side of said rotor element and a filtering surface of the other of said filter elements, the improvements comprising a plurality of spaced-apart, plate-disc baffles mounted to the interior surface of said housing and extending inwardly toward said rotor element in the region between said annular filter elements and the outside edge of said rotor element.

9. The improvement of claim 8 further comprising at least one pocket in the interior surface of said housing at least between two of said plate-like baffles.

10. The improvement of claim 9 wherein said pocket is a groove disposed substantially parallel to said rotor shaft.

11. The improvement of claim 8 further comprising a plurality of pockets in the interior surface of said housing between successive baffles with said baffles said spaced substantially uniformly around the full interior surface of said housing.

* * * * *